(12) United States Patent
McCormack

(10) Patent No.: US 8,755,913 B2
(45) Date of Patent: Jun. 17, 2014

(54) LIGHTING CONTROL NETWORK

(75) Inventor: James Joseph Anthony McCormack, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 369 days.

(21) Appl. No.: 13/201,519

(22) PCT Filed: Feb. 15, 2010

(86) PCT No.: PCT/IB2010/050669
§ 371 (c)(1),
(2), (4) Date: Aug. 15, 2011

(87) PCT Pub. No.: WO2010/095087
PCT Pub. Date: Aug. 26, 2010

(65) Prior Publication Data
US 2011/0295389 A1 Dec. 1, 2011

(30) Foreign Application Priority Data
Feb. 19, 2009 (EP) ..................................... 09153231

(51) Int. Cl.
*G05B 11/01* (2006.01)

(52) U.S. Cl.
USPC .............................. 700/19; 700/275; 315/312

(58) Field of Classification Search
USPC .......................... 700/1, 19, 275; 315/291, 312
See application file for complete search history.

(56) References Cited

U.S. PATENT DOCUMENTS

| | | | |
|---|---|---|---|
| 5,384,697 A * | 1/1995 | Pascucci ........................ | 700/10 |
| 5,444,851 A * | 8/1995 | Woest ........................... | 709/222 |
| 6,028,848 A * | 2/2000 | Bhatia et al. .................. | 370/257 |
| 6,611,537 B1 * | 8/2003 | Edens et al. .................. | 370/503 |
| 6,901,439 B1 | 5/2005 | Bonasia et al. | |
| 7,433,740 B2 * | 10/2008 | Hesse et al. ........................ | 700/1 |
| 2003/0174070 A1 * | 9/2003 | Garrod et al. ............. | 340/870.07 |
| 2005/0027888 A1 * | 2/2005 | Juszkiewicz .................. | 709/250 |
| 2006/0095146 A1 * | 5/2006 | Hesse et al. ...................... | 700/19 |
| 2006/0155865 A1 * | 7/2006 | Brandt et al. .................. | 709/230 |
| 2008/0068204 A1 | 3/2008 | Carmen et al. | |
| 2008/0222532 A1 * | 9/2008 | Mester et al. .................. | 715/738 |
| 2009/0105846 A1 * | 4/2009 | Hesse et al. ........................ | 700/1 |
| 2009/0278479 A1 * | 11/2009 | Platner et al. ................. | 315/312 |

FOREIGN PATENT DOCUMENTS

| WO | 9935770 A2 | 7/1999 |
|---|---|---|
| WO | 2008078256 A2 | 7/2008 |

OTHER PUBLICATIONS

Munk-Stander et al., Implementing a ZigBee Protocol Stack and Light Sensor in TinyOS, 2005, pp. 1-60, Department of Computer Science, University of Copenhagen.

* cited by examiner

*Primary Examiner* — Charles Kasenge
(74) *Attorney, Agent, or Firm* — Yuliya Mathis

(57) ABSTRACT

A control system (10) comprises:
  a controlled device (15) controlled by a controller (30) having receiving means (34) for receiving command signals (40), and having a first, second and third storage locations (31, 32, 33) for storing a personal ID or address (PID), network ID (NID), and the ID (RCID) of a remote control device, respectively;
  at least one user-operable remote control device (17), designed for transmitting command signals.
A command signal comprises a target address code, a network ID code, a sender address code, and a command code. Normally, the controller only responds to control signals if target address code, network ID code, and sender address code match with the information in memory.
The controller is capable of operating in a NO NETWORK mode (200), in which the controller responds to a reset command irrespective of target address code, the network ID code, and the sender address code.

10 Claims, 3 Drawing Sheets

LIGHTING CONTROL NETWORK

FIELD OF THE INVENTION

The present invention is in general applicable in any network of mutually cooperating devices, where the devices communicate wirelessly with each other. Particularly, the present invention relates to a lighting control network in buildings such as offices and residential houses, and the invention will hereinafter be specifically explained for this situation.

BACKGROUND OF THE INVENTION

FIG. 1 schematically illustrates a conventional home lighting system 1. In a room 2, a lighting device 3 is mounted, for instance to the ceiling. The lighting device 3 comprises a fixed housing 4 and a replaceable light generating element 5, for instance an incandescent light bulb, which will hereinafter be indicated as "lamp". A control switch 6 is mounted at a suitable location, for instance on the wall adjacent an entrance door. Electric wiring carrying mains voltage may be arranged in the ceiling. For connecting the lighting device 3, one mains wire may be connected to the lighting device directly. For being able to control the lighting device 3 with the control switch 6, at least one mains wire must be connected to the control switch 6 and one switch output wire is connected to the lighting device 3.

In this example, the lighting device 3 and the switch 6 are associated with each other, which means that the ON/OFF status of the lighting device 3, or perhaps even a dimming level, is controlled by the switch 6. Another example is an armature with an extension cord with a plug for connection with a wall socket, having a switch mounted in the extension cord.

In order to allow a user more flexibility and control comfort, systems have been developed where the lighting devices are controlled wirelessly by a remote control device. FIG. 2 schematically illustrates such system 10. The figure shows two lighting devices 13A, 13B, each connected to the electric mains wiring directly, each comprising a fixed housing 14A, 14B and a replaceable lamp 15A,15B, and each provided with a receiver 16A, 16B for receiving wireless control signals. The system 10 further comprises a remote control device 17, comprising a transmitter 18 for emitting wireless control signals, for instance, but exclusively, radio signals according to the Zigbee protocol. The remote control device 17 may be wall-mounted, but it may conveniently be a hand-held device, allowing the user to operate it from any location. The remote control device 17 may for instance have individual keys associated with individual receivers allowing individual switching of the associated lighting devices, or may have group keys to allow switching of a group of lighting devices simultaneously.

In each lighting device 13, there will be a controlling device (not shown for sake of simplicity) processing the received remote control signals and operating a built-in switch on the basis of these signals. This intelligence may physically be mounted in the housing 14, so that the lighting device 13 can be equipped with any standard lamp, but it is also possible that this intelligence is physically mounted in the lamp 15, so that it is simply possible to exchange lamps in an existing situation in order to obtain the wireless control facility; hereinafter, it will be assumed that the intelligence is mounted in the lamp, indeed. It is noted that in such situation there still would be the "hard" mains switch 6, which should be left in the position "ON", but which can be turned to the position "OFF" in order to switch lamps off the hard way.

Building such lighting system 10 does not only require the physical mounting of the individual components. It also requires setting up a system definition, i.e. a relationship between the individual lamps and the remote control 17. For instance, the remote control 17 needs to know which lamps it is allowed to control, and the lamps need to know which remote control 17 they are to obey. If two neighbors have the same system, these systems should not interfere with each other. To this end, each device in the system has a device ID, and the command signals include the ID of the intended receiver lamp as well as the ID of the remote control 17 and a network ID. In an initiation process, a new lamp or a new remote control will be added to the network and lamp(s) and remote control(s) will be associated. The membership of network and association is protected, which means that a lamp will only obey commands given by the associated remote control 17.

SUMMARY OF THE INVENTION

A problem may occur when a lamp is placed in a situation where its associated remote control device is not available. There are several scenarios conceivable giving rise to such a situation. One possible scenario is that the entire system has been reset at a moment when this specific lamp was not active. Another possible scenario is that the lamp is taken out of its network and brought to a different location, for instance as a gift to someone else or as a replacement of a defective lamp.

In such situation the lamp needs to be reset in order to return to factory settings. The lamp itself does not have a reset button. The remote control device typically does have a button to issue a reset command, but the lamp ignores the remote control device since it is not an associated device.

Reference is made to WO-2008/078256, whose details are incorporated herein by reference. This document describes a remote control device issuing an "all overruled reset command" at reduced power, so that it can only be received by lamps within a short distance. The procedure as described in this document can only be performed if the lamp and the remote control device are associated.

With reference to its FIG. 2, the document also describes an automatic reset procedure without receiving a reset command. On power up (switching on the mains), a lamp checks whether it has a network ID, indicating that it is a member of a network, and then it investigates whether there are any other devices within communication range having the same network ID. If it does not find other devices belonging to the same network within a certain predefined time period, it will automatically reset itself.

Reference is made to US-2008/0068204, whose details are incorporated herein by reference. This document describes a reset procedure which requires switching the mains off briefly in order to bring the lamps into a "listening" mode. Such procedure is not suitable in situations where the mains supply does not have a mains switch, or in situations where multiple lamps share one common mains supply, or in situations where switching off a lamp leaves the user in the dark. Further, this known procedure requires the remote control to listen for a message sent out by the lamp in response to the switching of the mains, indicating that it is ready-to-be-reset. Also, a problem may be that in inadvertent power dip may cause the lamps to enter the ready-to-be-reset state. Finally, the document does not address the problem of a lamp finding itself in a "strange" network, not recognizing the remote control devices and therefore ignoring its commands.

It is a general objective of the present invention to provide a solution to the above problems.

According to an important aspect of the present invention, a lamp enters a special operative mode if it cannot find its network, and in this special operative mode it will accept a reset command from any remote control device.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
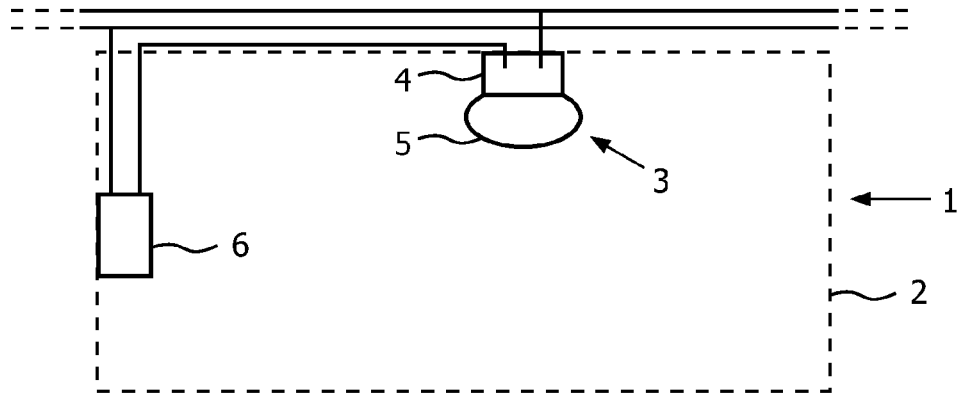
FIG. 1 schematically illustrates a conventional home lighting system.
Figure 2:
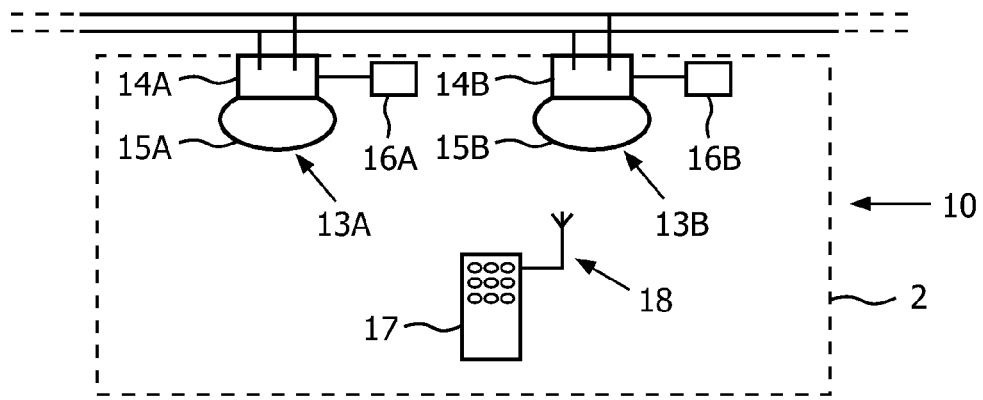
FIG. 2 schematically illustrates a lighting system where the lighting devices are controlled wirelessly by a remote control device.
Figure 3:
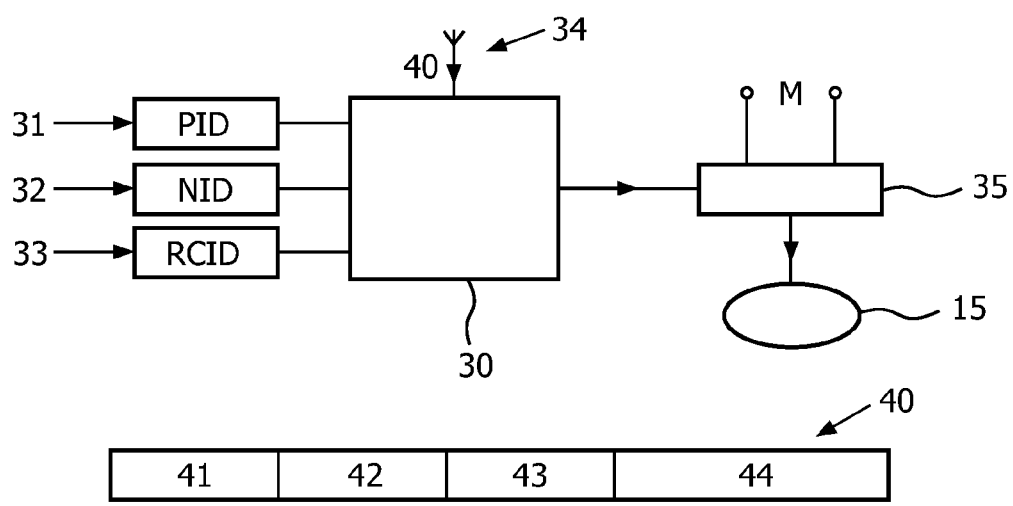
FIG. 3 schematically illustrates a controller associated with a lamp.

FIG. 3 schematically illustrates a controller 30 associated with a lamp 15. The controller 30 is equipped with a receiver 34 for receiving wireless control signals 40, and a controllable driver or switch 35 between mains M and lamp 15. The controller 30 is further equipped with a memory including a first storage location 31 for storing a personal ID or address PID, a second storage location 32 for storing a network ID NID, and a third location 33 for storing the ID RCID of a remote control device. The figure also illustrates that a control signal 40 comprises at least a first data portion 41 containing a target address code, a second data portion 42 containing a network ID code, a third data portion 43 containing a sender address code, and a fourth data portion 44 containing a command code.

Figure 4:
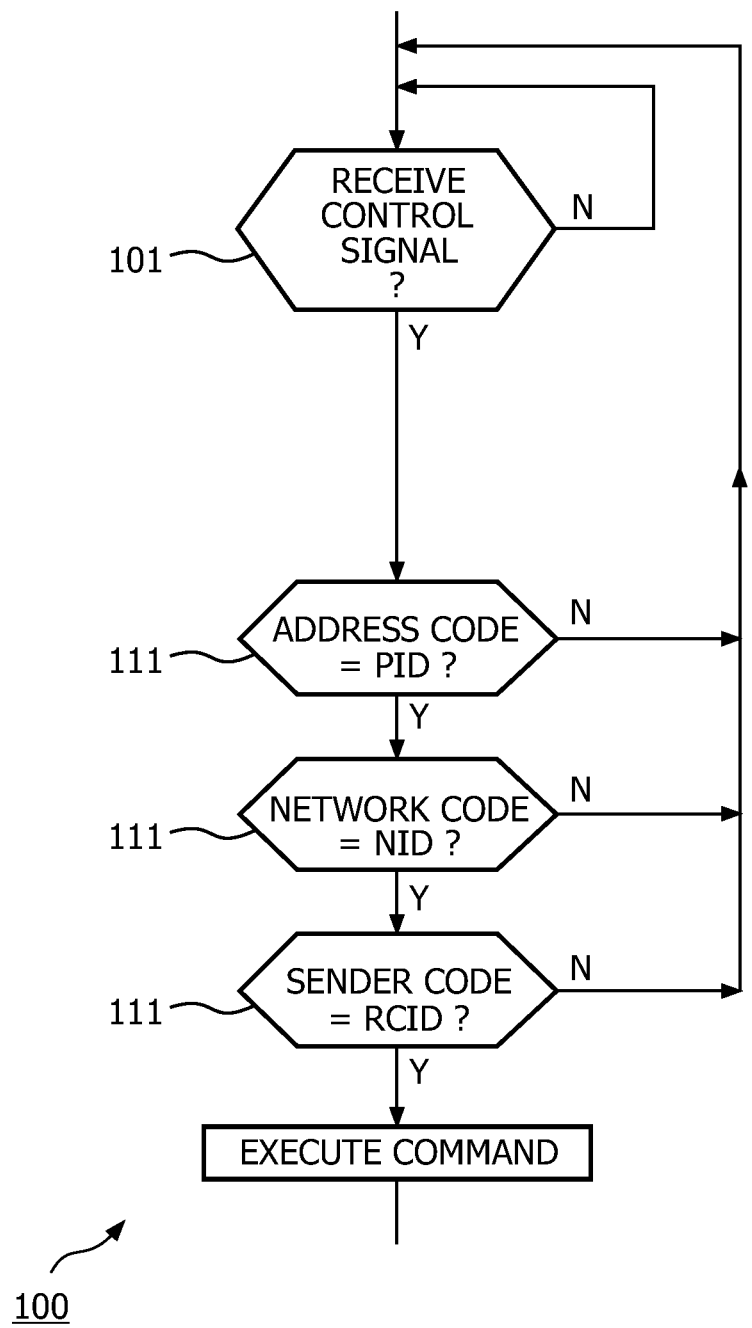
FIG. 4 is a flow diagram schematically illustrating normal operation of the controller of FIG. 3.

FIG. 4 is a flow diagram schematically illustrating normal operation 100 of the controller 30. In step 101, the controller 30 checks whether it has received a control signal 40. If so, then in step 111 it reads the target address code from the first data portion 41 and compares it with the PID in the first storage location 31, in step 112 it reads the network ID code from the second data portion 42 and compares it with the NID in the second storage location 32, and in step 113 it reads the sender address code from the third data portion 43 and compares it with the RCID in the third storage location 33. It should be clear that the order of these steps is not essential. Only if there is a match in all three accounts, the controller 30 will execute the command code contained in the fourth data portion 44, which may for instance involve switching the lamp 15 ON or OFF or increasing/decreasing a dim level. The command code may also be a reset command.

Assume that this lamp is taken out of its normal armature and placed in a different armature within the same network. It may be that the user wishes to re-assign this lamp, and issues a reset command with the associated remote control device. The controller 30 will execute this reset command, because the control signal 40 will match with the PID and with the NID and with the RCID.

Now assume that this lamp is taken out of its normal armature and placed in a different armature in a different network. The new user has to assign the lamp, and issues a reset command with his remote control device. At least, the control signal 40 will contain a network code not matching with the NID in the second storage location 32, and will contain a sender address code not matching with the RCID in the third storage location 33, so that the controller 30 will ignore this reset command.

Figure 5:
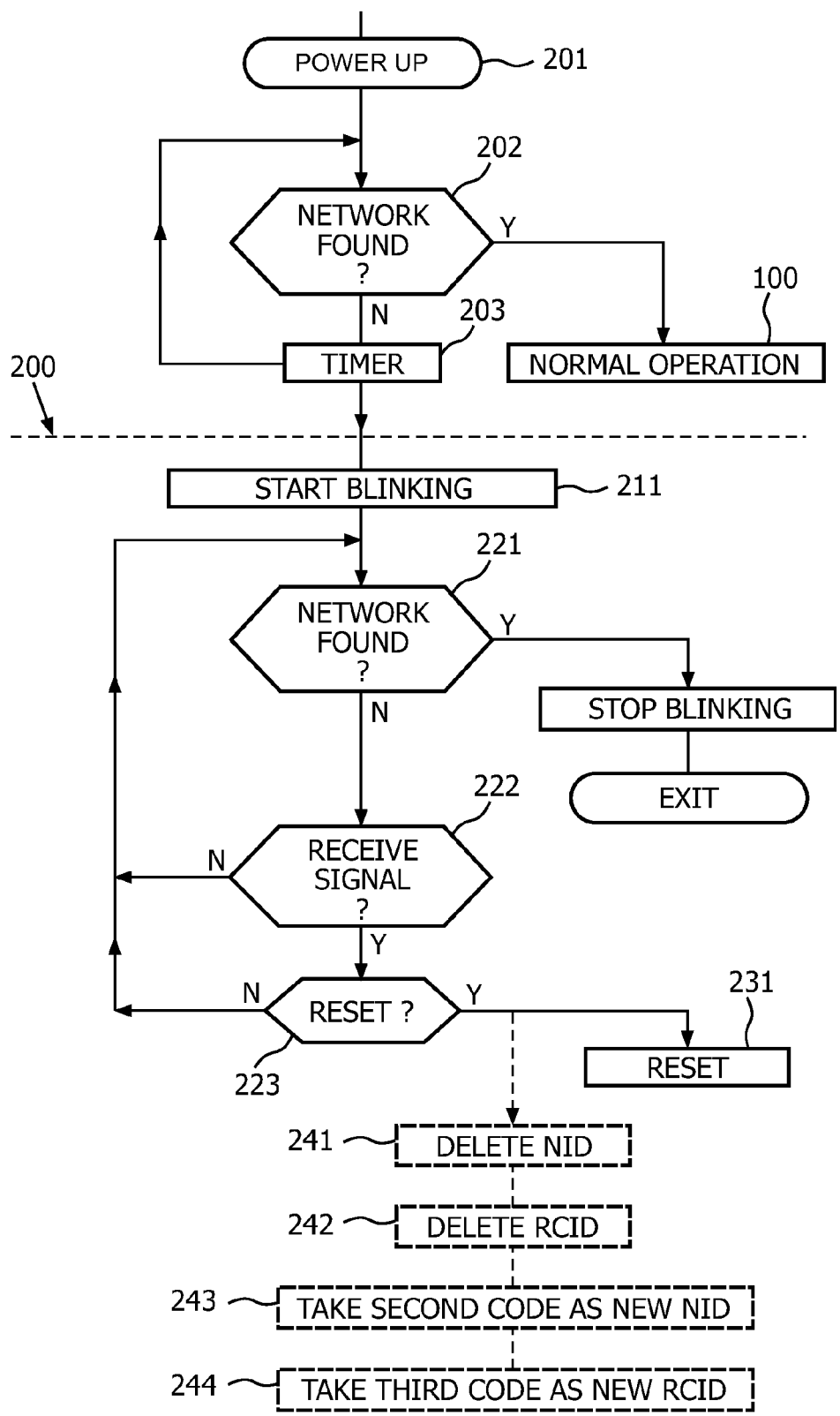
FIG. 5 is a flow diagram schematically illustrating operation of the controller in a special NO NETWORK mode.

According to the invention, the controller 30 is capable of operating in a special NO NETWORK mode 200 in which it expects to be reset by any remote control device, irrespective of network code and sender address code in the control signal 40, as illustrated in FIG. 5.

After power up (step 201), the controller 30 reports itself to the network (step 202): it sends a polling signal, mentioning its PID and its NID, and listens to receive acknowledgment signals from other devices belonging to the same network. If the network is found, i.e. if any device having the same network ID responds, it will enter into normal operation 100. If on the other hand the network is not found within a predetermined time period, as defined by a timer in step 203, the controller 30 enters the NO NETWORK mode 200.

In this NO NETWORK mode 200, it is preferred that the controller 30 first starts blinking of the lamp 15 (step 211), in order to signal to the user that it is without network and needs to be reset. However, it is also possible that the controller 30 does not blink at all, or only after passing of a certain delay, on the basis of the assumption that the user will know that he has added a new lamp and does not need to be made aware that the lamp needs to be reset.

In step 221, the controller 30 again checks whether it can find the network, similar as in step 202. If the network is found, the controller 30 will stop blinking and will exit the NO NETWORK mode 200. In step 222, the controller 30 checks whether it has received a control signal 40, and if so, it investigates in step 223 the command code in the fourth data portion 44 to see whether this is a reset command It is to be noted now that the controller 30 ignores the information in the first, second and third data portions 41, 42, 43. It is preferred that the remote control device 17 is designed to transmit any reset command signal at a relatively low power, so that it can only be received by receivers within a short range of for instance 1 meter.

Alternatively, or additionally, in order to prevent other lamps to respond to the reset command, it is possible that the remote control device 17 uses in the first data portion 41 a code that is normally not used as an address for a lamp, and/or uses in the second data portion 42 a code that is normally not used as a network code or is at least different from its actual network code, and/or uses in the third data portion 43 a code that is normally not used as a sender code or is at least different from its actual sender code.

However, already existing remote control devices will only be able to transmit the reset command as they normally do, which includes incorporating their actual network code and their actual sender code.

It is further possible that the remote control device 17 uses a special reset command code, which differs from a normal reset command code, and which is only obeyed by lamp controllers operating in the NO NETWORK mode 200. However, already existing remote control devices will only be able to transmit the normal reset command code, and the lamp controller 30 should be responsive to such normal reset command code as well.

It is also possible that a lamp controller does not start blinking in step 211, but instead only starts blinking after having received the reset command in step 223, while at the same time it may transit its address to the remote control device. The user now can visually see which lamps respond by blinking. If only one lamp blinks, the user may press a confirm button, and the lamp controller responds to this confirm command by resetting (step 231) or the alternative steps 241-244. Or, if the remote control device only receives back one lamp address, it may automatically send the confirm command. Instead of a reset command followed by a confirm command, the remote control device may also send a reset request command followed by an actual reset command.

If the controller 30 in step 223 has detected a reset command, it may perform a reset (step 231), which involves deleting the network ID from the second memory location 112 and returning all settings to their "factory new" values. After this, the lamp 15 is ready for joining the network in the normal way, as if it were a new device just purchased and taken out of its box.

Alternatively, it is also possible that the controller 30, after in step 223 having detected a reset command, only deletes the network ID from the second memory location 112 and deletes the sender code from the third memory location 113, and instead takes the code contained in the second data portion 42 of the reset command 40 to store this code into the second memory location 112 as a new NID and takes the code contained in the third data portion 43 of the reset command 40 to store this code into the third memory location 113 as a new RCID (steps 241-244). This procedure is not truly a reset, it is rather a "takeover" by a new RC.

Thus, the important advantage is achieved that the lamp can be reset wirelessly by ANY remote control device, regardless of whether it is joined (or associated) with the lamp. No special second communication system is required for reset: it all works on the same RF protocol and hardware as normal operation. Furthermore, the preferred embodiment requires proximity between the control device and the lamp: this prevents malicious resets from third parties (at distance). Hence, the user then has deterministic reset behavior.

Summarizing, the present invention provides a control system 10, which comprises:
- a controlled device 15 controlled by a controller 30 having receiving means 34 for receiving command signals 40, and having a first, second and third storage locations 31, 32, 33 for storing a personal ID or address PID, network ID NID, and the ID RCID of a remote control device, respectively;
- at least one user-operable remote control device 17, designed for transmitting command signals.

A command signal comprises a target address code, a network ID code, a sender address code, and a command code.

Normally, the controller only responds to control signals if target address code, network ID code, and sender address code match with the information in memory. The controller is capable of operating in a NO NETWORK mode 200, in which the controller responds to a reset command irrespective of target address code, the network ID code, and the sender address code.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, the lamp controller function may be located in a lamp fitting or it may be integrated in the lamp itself Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A control system, comprising:
   a network;
   a controlled device comprising a controller configured to wirelessly receive a command signal on the network, a-first storage location storing a personal ID, a second storage location storing a network ID, and a third storage location storing a remote control ID; and
   a user-operable remote control device configured to transmit the command signal on the network at a first power level;
   wherein the command signal comprises a first data portion containing a target address code, a second data portion containing a network ID code, a third data portion containing a sender address code, and a fourth data portion containing a command code;
   wherein the controller is further configured to operate in one of the group consisting of a normal mode and a no network mode, wherein in the normal mode, the controller, in response to receiving the control signal, reads the target address code and performs a first comparison of the target address code with the personal ID, reads the network ID code and performs a second comparison of the network ID code with the network ID, and reads the sender address code and performs a third comparison of the sender address code with the remote control ID, and, if any one of the group consisting of the first comparison, the second comparison, and the third comparison does not match, is configured to perform one of the group consisting of ignoring the command code, and executing the command code, wherein in the no network mode, the controller, in response to receiving a reset command comprising the control signal containing a reset command code in the fourth data portion, executes a response procedure, wherein the controller is further configured to:

report itself to the network after power up;
wait for a response from the network; and
enter the no network mode if the controller does not receive a response having the network ID.

2. The system according to claim 1, wherein the controlled device comprises a lamp, and the controller is further configured to blink the lamp after entering the no network mode.

3. The system according to claim 1, wherein the controlled device comprises a lamp, and wherein the controller, after receiving the reset command in the no network mode, is further configured to blink the lamp and to receive a confirm command and respond to said confirm command by executing the response procedure.

4. The system according to claim 1, wherein the response procedure comprises performing a reset further comprising deleting the network ID from the second storage location and returning all settings to a set of default values.

5. The system according to claim 1, wherein the response procedure comprises at least one of the group consisting of replacing the network ID in the second storage location by a code contained in the second data portion of the reset command, and replacing the sender code in the third storage location by a code contained in the third data portion of the reset command.

6. The system according to claim 1, wherein the remote control device is further configured to transmit the reset command at a second power level, wherein the second power level is lower than the first power level.

7. The system according to claim 1, wherein the remote control device is configured to transmit the reset command comprising at least one of the group consisting of a non-standard lamp address code in the first data portion, a non-standard network code in the second data portion, and a non-standard sender code in the third data portion.

8. The system according to claim 1, wherein the controller, after receiving the reset command in the no network mode, is further configured to blink the lamp and to receive a confirm command and respond to said confirm command by executing the response procedure.

9. A control system, comprising:
a network;
a controlled device comprising a controller configured to wirelessly receive a command signal on the network, a-first storage location storing a personal ID, a second storage location storing a network ID, and a third storage location storing a remote control ID; and
a user-operable remote control device configured to transmit the command signal on the network at a first power level;
wherein the command signal comprises a first data portion containing a target address code, a second data portion containing a network ID code, a third data portion containing a sender address code, and a fourth data portion containing a command code;
wherein the controller is further configured to operate in one of the group consisting of a normal mode and a no network mode, wherein in the normal mode, the controller, in response to receiving the control signal, reads the target address code and performs a first comparison of the target address code with the personal ID, reads the network ID code and performs a second comparison of the network ID code with the network ID, and reads the sender address code and performs a third comparison of the sender address code with the remote control ID, and, if any one of the group consisting of the first comparison, the second comparison, and the third comparison does not match, is configured to perform one of the group consisting of ignoring the command code, and executing the command code, wherein in the no network mode, the controller, in response to receiving a reset command comprising the control signal containing a reset command code in the fourth data portion, executes a response procedure, wherein the controlled device further comprises a lamp, and the controller is further configured to blink the lamp after entering the no network mode.

10. A control system, comprising:
a network;
a controlled device comprising a controller configured to wirelessly receive a command signal on the network, a-first storage location storing a personal ID, a second storage location storing a network ID, and a third storage location storing a remote control ID; and
a user-operable remote control device configured to transmit the command signal on the network at a first power level;
wherein the command signal comprises a first data portion containing a target address code, a second data portion containing a network ID code, a third data portion containing a sender address code, and a fourth data portion containing a command code;
wherein the controller is further configured to operate in one of the group consisting of a normal mode and a no network mode, wherein in the normal mode, the controller, in response to receiving the control signal, reads the target address code and performs a first comparison of the target address code with the personal ID, reads the network ID code and performs a second comparison of the network ID code with the network ID, and reads the sender address code and performs a third comparison of the sender address code with the remote control ID, and, if any one of the group consisting of the first comparison, the second comparison, and the third comparison does not match, is configured to perform one of the group consisting of ignoring the command code, and executing the command code, wherein in the no network mode, the controller, in response to receiving a reset command comprising the control signal containing a reset command code in the fourth data portion, executes a response procedure, wherein the remote control device is further configured to transmit the reset command at a second power level, wherein the second power level is lower than the first power level.

* * * * *